(No Model.) 2 Sheets—Sheet 1.
R. P. CAFFERTY, Jr.
HORSE BRUSH.

No. 559,673. Patented May 5, 1896.

WITNESSES:
Edward C. Rowland.
Beatrice M. Donaldson.

INVENTOR
Ridner P. Cafferty Jr.
BY A. M. Pierce
ATTORNEY.

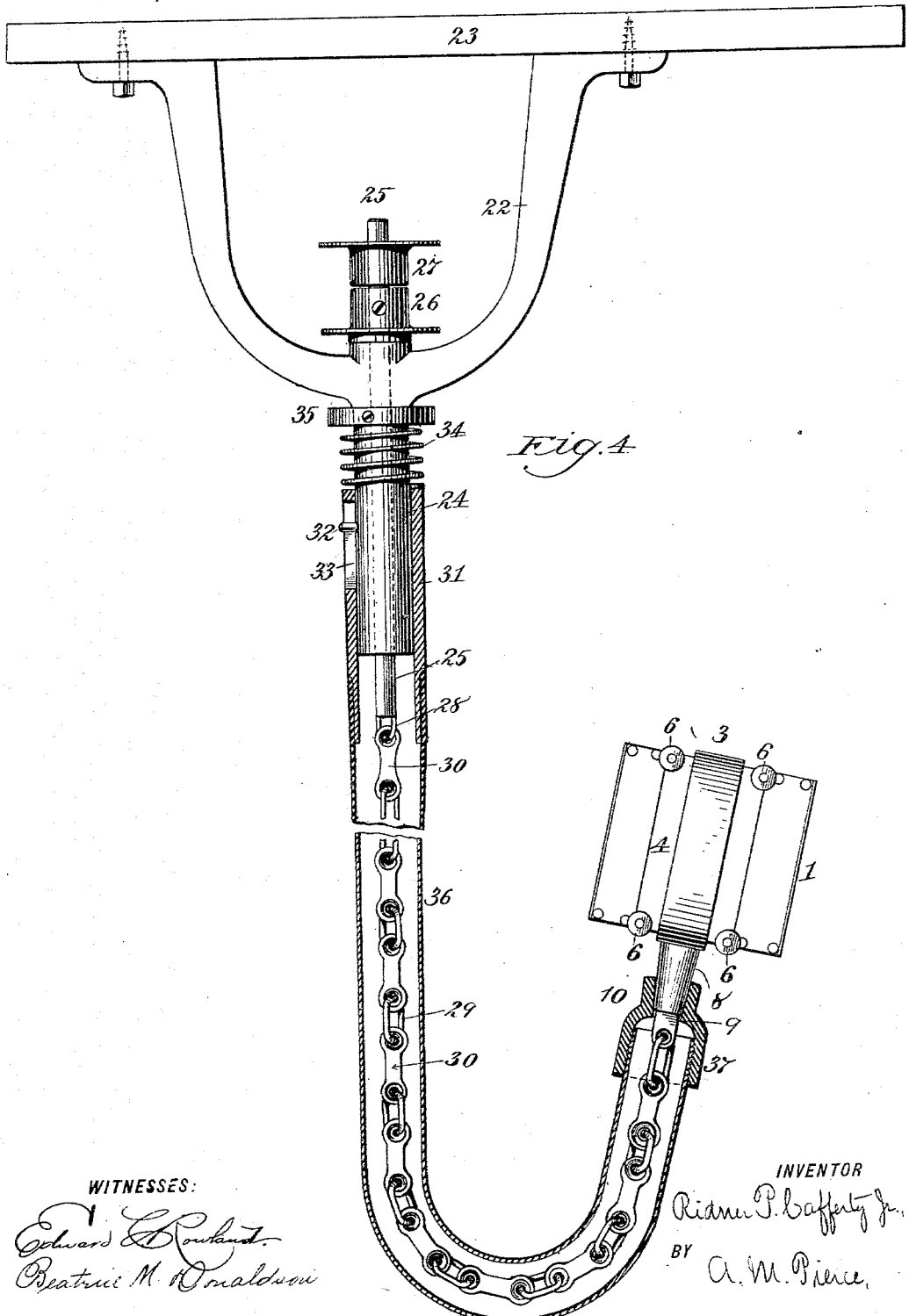

UNITED STATES PATENT OFFICE.

RIDNER P. CAFFERTY, JR., OF NEW YORK, N. Y.

HORSE-BRUSH.

SPECIFICATION forming part of Letters Patent No. 559,673, dated May 5, 1896.

Application filed December 6, 1895. Serial No. 571,236. (No model.)

*To all whom it may concern:*

Be it known that I, RIDNER P. CAFFERTY, Jr., a citizen of the United States, residing in the city, county, and State of New York, have invented a new and useful Improvement in Power Horse-Brushes, of which the following is a specification.

My invention relates especially to devices employed for cleaning or brushing horses, and has for its object the provision of a simple, cheap, and effective power-brush and means for driving the same.

To attain the desired end, my invention consists, essentially, in a pair of rotatable brushes mounted in an inclosing frame adapted to be held in the hand, the said brushes rotating toward each other so as to remove the dirt, dust, &c., from the animal and collect it within the brush-inclosing frame; and my invention also involves certain other novel and useful combinations or arrangements of parts and peculiarities of construction and operation, all of which will be hereinafter first fully described, and then pointed out in the claims.

Figure 1:
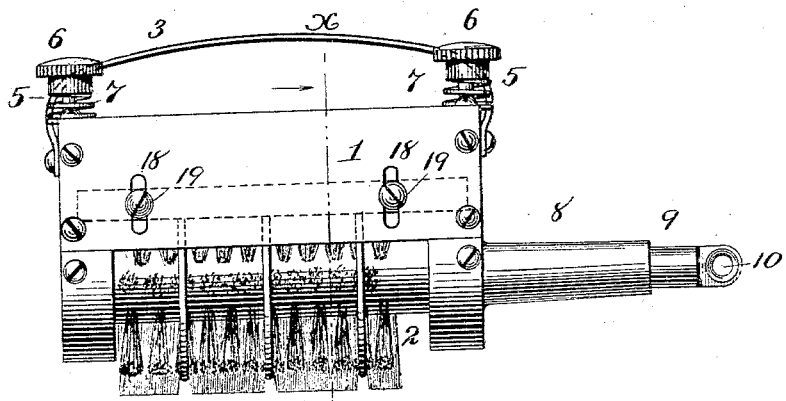
Figure 2:
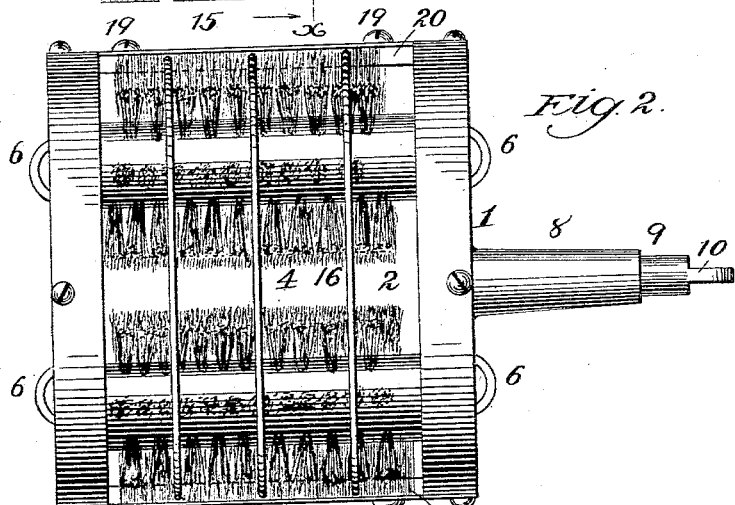
Figure 3:
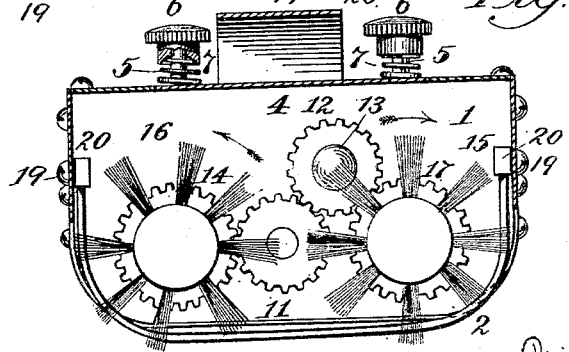

In the accompanying drawings, forming a part hereof, Figure 1 is a side elevation of my power-brush. Fig. 2 is a bottom plan view thereof. Fig. 3 is a cross-sectional view at line $x\ x$ of Fig. 1. Fig. 4 is a longitudinal sectional view of the driving mechanism.

Similar numerals of reference wherever they occur indicate corresponding parts in all the figures.

1 is the brush-case, made of any suitable material, open at 2 for the brushes to project.

3 is a strap fixed to the case for passing the hand of the operator beneath when the device is in use.

4 is a removable plate secured at the back of the brushes for the purpose of emptying or cleaning out the dirt which is gathered in brushing. This plate is held to the body of the case 1 by means of four screw-threaded studs 5, which project therefrom, pass through perforations in the plate 4, and are surmounted by thumb-nuts 6. These nuts 6 are hollowed out at their lower faces and receive the outer portion of a spring 7, which bears upon the plate 4 when the nuts 6 are screwed down upon the studs 5. The object of this arrangement is to prevent the nuts being loosened and passing from the studs 5 by reason of the rapid vibration of the case when the brushes are in motion.

Projecting from the case 1 is a bearing 8, wherein is mounted a shaft 9, having an eye 10 at its outer extremity and carrying a gear-wheel 11 within the case 1. The teeth of the wheel 11 mesh with an idler 12, mounted upon a stud 13, and with a wheel 14, fixed upon the shaft of a brush 16. The teeth of the idler 12 mesh with a similar wheel 17, mounted upon the shaft of a brush 15. These brushes are rotatably journaled in the frame 1, and when in motion revolve as indicated in Fig. 3, thus throwing all the material removed in brushing a horse into the space back of the brushes, from whence it is readily removed by taking off the plate 4. The ends of the case 1 are provided with slots 18, through which pass screws 19, arranged to engage with bars 20, bearing rods or wires 21, which pass over the exposed faces of the brushes and between the brush-bristles. By this arrangement the depth to which the brushes will penetrate the hair of the horse being operated upon may be accurately regulated in accordance with the length of the animal's hair and other requirements, and all allowances can be made for the wearing off of the brush, as by setting the bars 20 the wires or rods 21 may be drawn inward or moved outward at pleasure.

Referring to Fig. 4 of the drawings, 22 is a yoke secured to any convenient support 23. This yoke is provided with a bearing 24, through which passes a driving-shaft 25, bearing a tight pulley 26 and loose pulley 27, arranged for receiving a driving-belt from any source of power. Fixed to an eye 28 is a chain, formed of alternate round links 29 and flat links or eyebars 30. It will be observed that the links 30 have the eyes therein beveled in such a manner as to present a broad bearing-surface at each side of the links 29 when torsional strain is applied, and I have thus provided a chain which is admirably adapted to the driving of devices of the character to which my invention relates. Surrounding the lower portion of the bearing is a sleeve 31, held therein by a pin 32 passing through a slot 33 and by a spring 34, which engages with the sleeve 31 and a collar 35, mounted thereabove. This arrangement permits a longitudinal movement of the flexible sheath 36, which is secured to the sleeve 31 and surrounds the driving-chain which passes from the eye 28 on the shaft 25 to the eye 10 on the shaft 9, the bearing 8 being fixed in a holding device 37, mounted upon the extremity of the sheath 31. By this arrangement the brush may be applied to any part of the animal with the greatest ease, and the driving mechanism does not in any way interfere with the operation.

Having now fully described my invention, what I claim as new therein, and desire to secure by Letters Patent, is—

1. A power horse-brush in which is comprised a pair of rotatable brushes mounted in an inclosing case in close proximity to each other, and arranged to rotate toward each other, in combination with means for rotating the brushes, and a wire guard extending over the faces of the brushes, between the bristles to limit the action of the brushes, substantially as shown and described.

2. In a device of the character herein specified the combination with the rotatable brushes, of adjustable guard and guide rods or wires passing over the faces of the brushes between the bristles to limit the action of the brushes, substantially as shown and described.

3. In a device of the character herein specified, the combination with the rotatable brushes mounted in a case open at one side, of the guard and guide wires fixed to adjustable bars within the case and passing between the bristles of the brushes whereby the guard-wires carried by the bars may be adjusted in position to limit the action of the brushes, substantially as shown and described.

4. The combination with the brush-inclosing case and removable back plate, of screw-threaded studs projecting from the body of the case through said plate, and the thumb-nuts engaging with the studs, and carrying springs held in place by cavities in their lower faces, substantially as shown and described.

5. The combination with the rotatable driving-shaft bearing a gear for operating the brushes, of a driving-chain connected therewith and with the source of power, said chain consisting of alternate links of round material and flat eyebars or links, the eyes wherein are beveled at each side, substantially as shown and described.

6. In a device of the character herein specified, a driving-chain consisting of alternate links of round material and flat eyebars or links, the eyes wherein are beveled at each side, substantially as shown and described.

RIDNER P. CAFFERTY, Jr.

Witnesses:
  A. M. PIERCE,
  BEATRICE M. DONALDSON.